(12) United States Patent
Epstein et al.

(10) Patent No.: US 6,529,600 B1
(45) Date of Patent: Mar. 4, 2003

(54) METHOD AND DEVICE FOR PREVENTING PIRACY OF VIDEO MATERIAL FROM THEATER SCREENS

(75) Inventors: Michael Epstein, Spring Valley, NY (US); Douglas A. Stanton, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/104,900

(22) Filed: Jun. 25, 1998

(51) Int. Cl.[7] .......................... H04N 7/167; H04K 1/02
(52) U.S. Cl. .................. 380/252; 380/201; 380/205; 380/221
(58) Field of Search .......................... 380/201, 203, 380/204, 206, 239, 262, 214, 215, 221, 222, 223, 224, 252, 205; 353/98–99; 352/68, 84, 180, 198; 359/850; 340/5.61, 5.6

(56) References Cited

U.S. PATENT DOCUMENTS

| | | | | |
|---|---|---|---|---|
| 4,815,013 A | * | 3/1989 | Schmidt | 364/525 |
| 5,079,544 A | | 1/1992 | Demond et al. | 340/701 |
| 5,096,286 A | | 3/1992 | Weisberger | 352/40 |
| 5,182,771 A | * | 1/1993 | Munich et al. | 380/5 |
| 5,680,454 A | * | 10/1997 | Mead | 380/14 |
| 5,751,264 A | | 5/1998 | Cavallerano et al. | 345/85 |
| 6,019,473 A | * | 2/2000 | Goodhill et al. | 352/180 |

* cited by examiner

Primary Examiner—Matthew Smithers

(57) ABSTRACT

A method and device for preventing video tape piracy of video material shown by an electronic projector by varying frequently the frame rate, line rate or pixel rate of the projector. In a preferred embodiment the frame rate is varied in accordance with a cryptographically secure algorithm. In another embodiment the frame rate is varied in accordance with the content of the scene in the film.

45 Claims, 4 Drawing Sheets

METHOD AND DEVICE FOR PREVENTING PIRACY OF VIDEO MATERIAL FROM THEATER SCREENS

BACKGROUND OF THE INVENTION

1. Field of the Invention

The invention relates in general to a method and device for preventing piracy of video material from theater screens and in particular to a method and device for preventing videotape piracy of material from theater screens by varying the frequency of the frame rate of a movie projector.

2. Description of the Prior Art

A frustrating problem in the movie industry is the pirating of first release films for the video tape market. In the movie industry, maximum profit is obtained by the use of "release windows." The essence of these release windows is to first release a film in first run theaters in the U.S. and then in succession second run theaters and various foreign markets, then to the airlines as in-flight movies, video tape and finally cable television. Movie pirates, however, frustrate the use of these release windows by entering a first run theater, videotaping the movie screen and then releasing pirated versions of the first run film on videotape to the public. This obviously causes substantial financial loss to the movie industry.

In a typical film based projection system the film is projected one frame at a time at 24 frames a second. Each frame has the projecting light flashed through the entire cell (that is all of the video lines are available all of the time). In reality the light is flashed at 48 times a second (twice on each frame). This is to avoid flicker perceptible to the human eye.

Video cameras scan very close to 30 frames a second with interlace (odd lines and then even lines.) Video cameras integrate light much the same way as the human eye does, but in fact video cameras have superior integration abilities. Accordingly alterations to a movie that will confuse the image for a video camera will typically render the image unwatchable to the audience.

When a video camera is used in a movie theater, the scanning of the light on the screen is easily recorded on video tape because the lines are available all of the time, the frame rate of the video camera is slower than that of the projector and the camera has excellent integration facilities.

Future cinemas will become electronic and movies will be projected via electronic projectors. These electronic projectors will most likely received digitized video. Examples of these projectors are digital light modulators (DMD's), liquid crystal displays (LCD's) and plasma devices. (U.S. Pat. No. 5,079,544 and U.S. patent application Ser. No. 08/495,290 describe DMDs and are hereby incorporated by reference.) In all probability the projectors will be progressive scan projectors (non-interlaced) which progressively scan a frame at 24 frames a second as before (an effective frame rate of 48 frames a second). However, even if future cinemas use interlaced scan projectors, where the image will not be flashed all at once but instead scanned line by line or by groups of lines much like a television display, if such images are video taped, only a minor distortion in the video tape occurs. It is similar to when a video tape is made of a television that is on, there is always a distortion of that image because the two scanning frequencies are not synchronized. Movie piracy by video tape still remains a problem with interlaced projectors because this distortion is easily removed by synchronizing the video camera to the frame rate of the projected video. As movie pirates are becoming increasingly more sophisticated, a better way of preventing piracy is needed.

SUMMARY OF THE INVENTION

Accordingly it is an object of the invention to prevent the piracy of movies in a movie theater when the movie is being displayed by an electronic projector. This object is achieved by changing frequently the frame rate of the projector. A relatively small adjustment of both increasing and decreasing the frame rate of the projector is not noticed by the viewers but causes synchronization problems for the pirate video camera operators.

When the frame rate is varied frequently it has the effect of constantly updating the synchronization problems of the bootleggers camera. Typically the integration rate is set on a video camera for a particular frame rate of the projector. If the frame rate is changed the integration must be changed manually. If the frame rate is changed frequently the integration must be changed frequently and synchronously, which is almost impossible to accomplish manually. The human eye adjusts its integration ability on a real time basis, therefore, the changing frame rate is not noticed by the human eye, yet it causes distortion in the video camera image. The resulting distortions on the bootleggers video tape if the bootlegger cannot keep up with the changing frame rate on a real time basis, are beat frequencies for the scenes being displayed at a reduced frame rate than the frame rate of the video camera and blurring of rapidly moving objects for scenes projected at the faster frame rate.

It is a further object of the invention to change the frame rate of the projector in a non-predictive manner such as by a cryptographically secure pseudo-random number generator or a natural source generator. This prevents the pirate from simply adjusting the video camera in a predictive manner to accommodate a predictively changing frame rate frequency.

It is yet another object of the invention to prevent piracy of a movie which has a changing frame rate when the pirate simply uses a slower frequency than any of the frame rates of the projector. This object is achieved by displaying scenes that contain slower motion at a reduced frame rate and scenes that contain rapid motion at an increased frame rate. The pirate's choice of a low frequency will then cause blurring of the rapidly moving objects in scenes projected at the faster rate.

In yet a further object of the invention, the frame rates of the scenes with slower motion are varied within a reduced frequency range, while scenes that contain high speed motion are varied within an increased frequency range.

It is yet even another object of the invention to vary the line rate of the projector and/or the pixel rate. These alterations will also cause distortion to the video camera operator.

It is yet even a further object of the invention to provide scene tags which indicate scenes that are to be displayed at slower frame rates and scenes that are to be displayed at faster frame rates. These scene tags are provided within the video stream after editing of the film and detected by the projector.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a better understanding of the invention, reference will be made to the following drawings.

DETAILED DESCRIPTION OF THE PREFERRED EMBODIMENT

Figure 1:
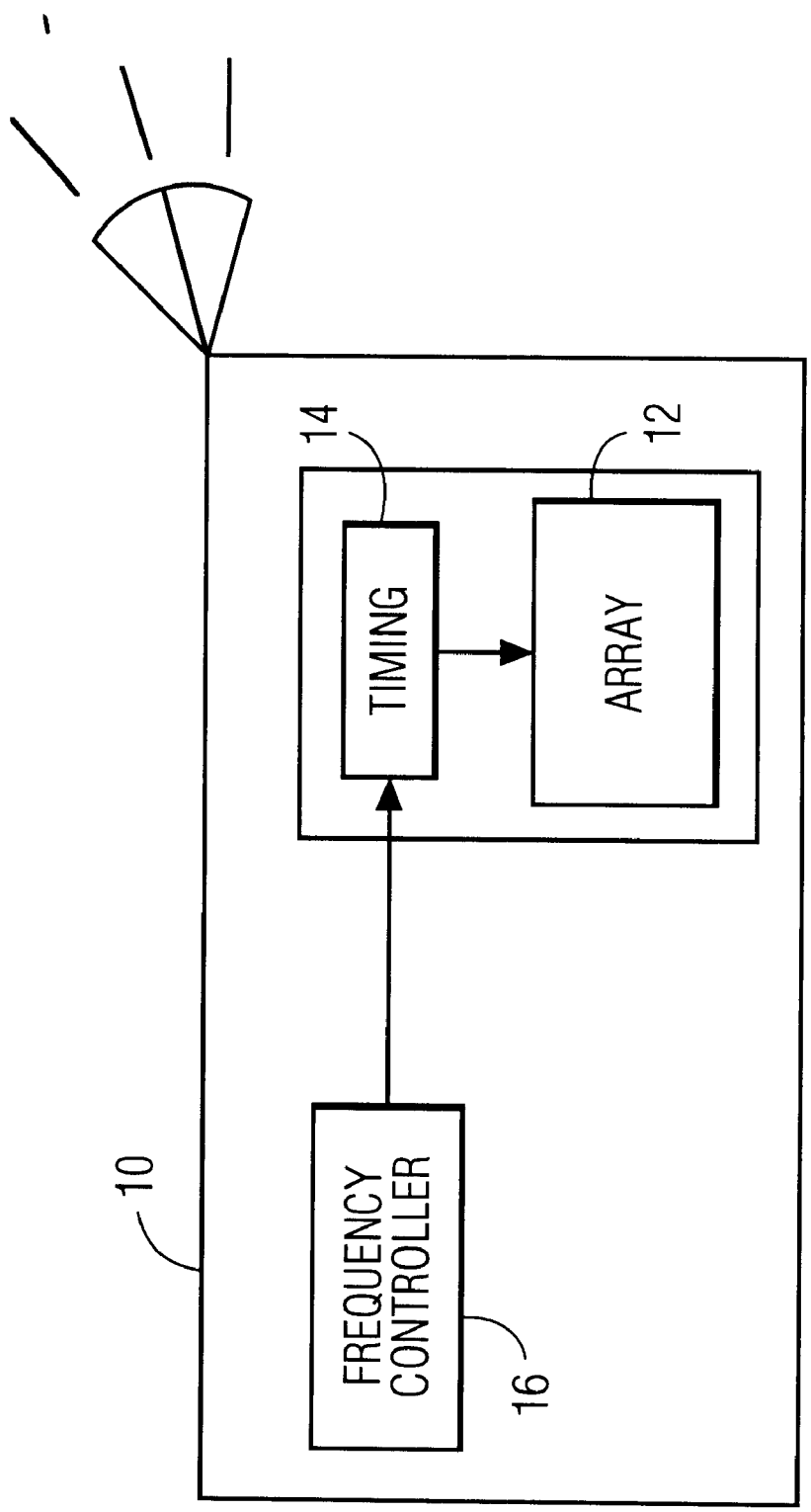
FIG. 1 is a diagram of an electronic film projector with a frame rate controller.

FIG. 1 shows a deformable mirror spatial light modulator (DMD) type electronic projector 10, including an array 12 of deformable mirror cells and a timing device 14 for modulating the entire array of mirrors 12 in accordance with the frame rate of the projector. In a typical electronic projector the timing circuit 14 controls the modulation of the mirrors such that the projecting light is flashed at a rate of 24 frames per second. In accordance with the invention, a frequency controller 16 is used to control the timing circuit 14. In one embodiment of the invention, the frame rate controller is a random number generator which causes a number to be added to or subtracted from the 24 frame per second frame rate. The result is that instead of a constant 24 frame per second frame rate, the frame rate varies to 24+X frames per second, and then 24+Y, 24−X, 24−Y frames per second etc. The timing circuit 14 responds to the signal from the frequency controller 16 and modulates the mirrors at the new frequency.

Figure 2:
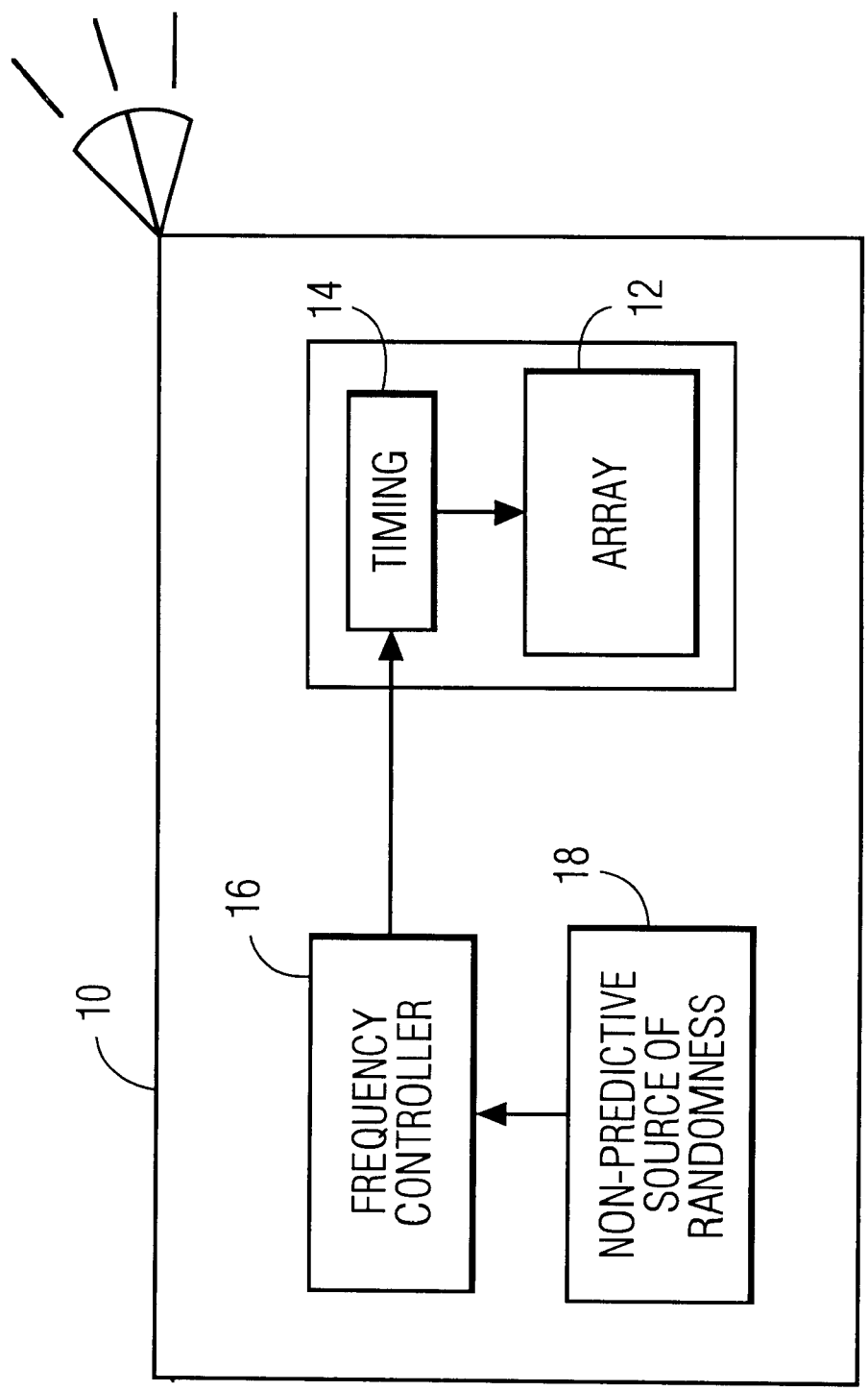
FIG. 2 is a diagram of an electronic film projector with a frame rate controller that is controlled by a non-predictive source of randomness such as a cryptographically secure algorithm.

In an alternate embodiment of the invention, shown in FIG. 2, the frequency controller 6 is controlled by a cryptographically secure algorithm 18. The cryptographically secure algorithm is used to ensure non-predictive randomness in the changing frame rate. If such an algorithm is used it makes it more difficult for the video camera operator to adjust the integration of the camera in accordance with a predictively changing frame rate.

An alternative to a cryptographically secure algorithm is a natural source generator such as the noise from a reverse biased zener diode, or radioactive decay. Both will provide the non-predictive randomness which will defeat a video camera operator.

Once a source of randomness is chosen, the randomness can be used in several modes. In a first mode of operation, a particular time interval is chosen and the frame rate is changed each time interval in accordance with the source of randomness.

| Frame rate | 24 + X, 24 + Y, 24 − Z, 24 −A | | | Frames/Second |
|---|---|---|---|---|
| Time Interval Between Frame Rate Changes | | | | |
| | 1/x | 1/x | 1/x | Seconds |

In a second mode of operation the frame rates are changed at random intervals of time, which provides increased security.

| Frame rate | 24 + X, 24 + Y, 24 − Z, 24 −A | | | Frames/Second |
|---|---|---|---|---|
| Time Interval Between Frame Rate Changes | | | | |
| | 1/a | 1/b | 1/c | Seconds |

This security prevents the movie theater pirate from simply adjusting the video camera in accordance with a predictive varying frame rate of the camera.

Although the invention has been described with reference to varying frame rates, the invention can also be implemented by varying the line rate of a frame or even the pixel rate. For example, in many electronic projectors that are either progressively scanned or interlaced, the lines are activated individually. Typically the time period between the activation of each line is constant. If this time period is varied in accordance with the source of randomness in a similar fashion as discussed with reference to the frame rate, it will also cause distortion to a video camera imaging the screen. Alternatively, the pixel rate within a line can be varied in accordance with the source of randomness. Whatever type of modification is made, the projector display rate should be varied so that it causes distortion to a video camera imaging the video from the screen yet is basically undetectable to a viewer.

Figure 3:
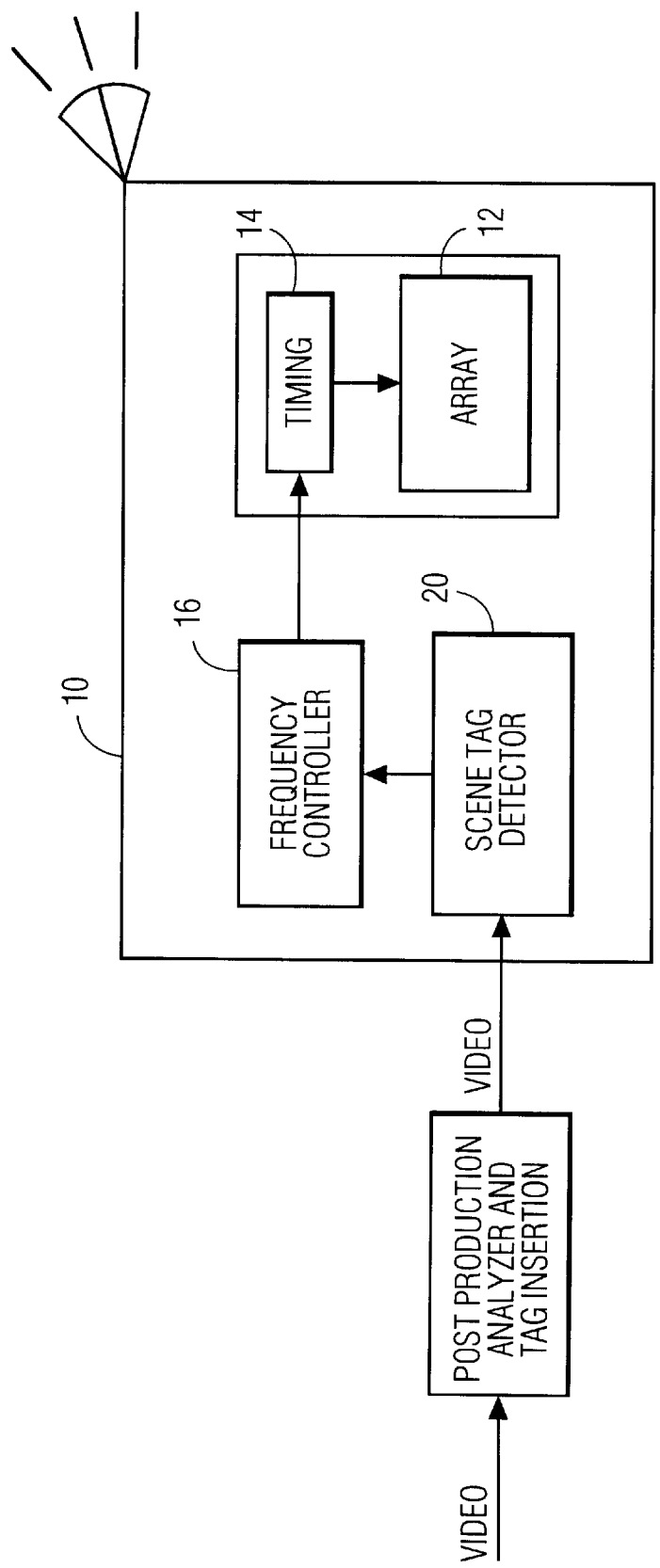
FIG. 3 is a diagram of an electronic film projector with a frame rate controller and a scene tag detector.
Figure 4:
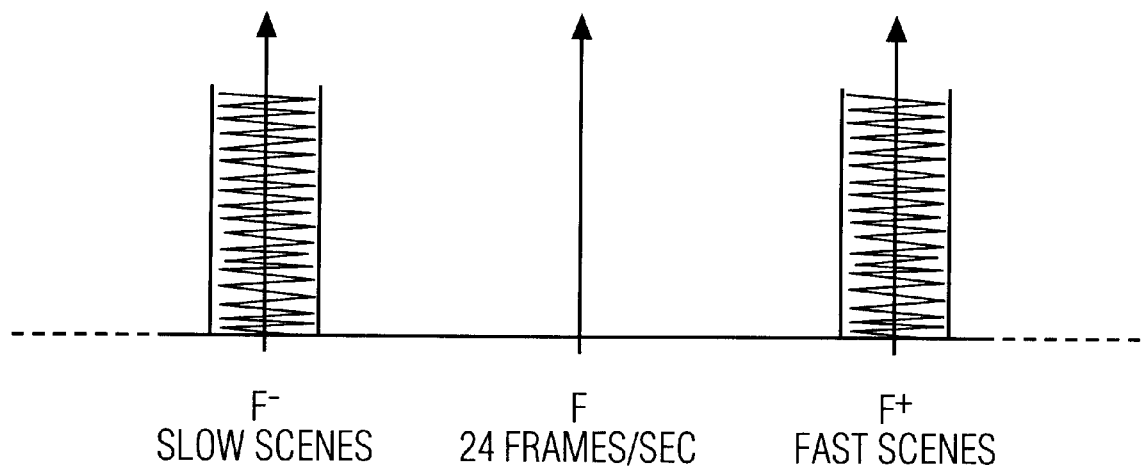
FIG. 4 is a frequency plot of the varying frequencies of the frame rate for scenes with little motion and scenes with a relatively large amount of motion.

FIG. 3 shows an alternate embodiment of the invention. In this embodiment the frame rate is varied (although the line or pixel rate can also be varied) in dependence on the motion in the video. The video is pretagged before it is received by the projector, such as during post-production. Tags or bits are added to the video stream that indicate scenes with high speed motion and scenes with little motion. The projector includes a scene tag detector 20 which detects these tags. In a preferred embodiment of the invention a person analyzes the video post-production 22 to determine the number of frames that pertain to a scene with high speed motion and the number of frames that pertain to a scene with little motion. The bit stream of the digitized video is then modified to include tags indicating this information. The scene tag detector 20 detects these tags and causes the frequency controller 16 to adjust the frame rate as follows. Full motion scenes are displayed with a higher frame rate than slow motion scenes. FIG. 4 shows the frequency spectrum of the frame rate of such a tagged movie. For scenes that are full motion the frame rate varies in the shaded area surrounding F$^+$. For scenes with little or no motion the frame rate varies in the shaded area surrounding F$^-$. Either the post-production analyzer can determine the variable random frame rate, or, as specified above, the electronic projector can vary the frame rate in a random manner in dependence on the tags.

It could also be envisioned that different degrees of motion can be tagged or detected and frame rates varied accordingly. If the electronic projector receives an MPEG video stream, a bit could be placed within the stream which indicates the amount of motion in the scene.

Choosing the suitable variation in frame, line and/or pixel rate depends on the type of projector being used. The key to the invention is to make sure that the frame, line and/or pixel rate varies frequently and that the change in rate does not cause significant distortion to the viewer in the movie theater yet causes synchronization problems for the video camera operator.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A device for preventing piracy of video projected by an electronic projector onto a screen, comprising:
   a frequency controller which provides an output signal for varying frequently the frame rate of the projector based on an image characteristic of the video, such that the varied frame rate causes distortion for a video camera imaging the screen yet is undetectable by a viewer watching the screen; and
   an electronic projector interface which provides the output from the frequency controller to the electronic projector.

2. A device for preventing piracy of video projected by an electronic projector as claimed in claim 1, further including a device which stores a cryptographically secure algorithm, coupled to the frequency controller, and wherein the frequency controller varies the frame rate of the projector in accordance with the algorithm.

3. A device for preventing piracy of video projected by an electronic projector as claimed in claim 1, further including a natural source generator, coupled to the frequency controller, and wherein the frequency controller varies the frame rate of the projector in accordance with the natural source generator.

4. A device for preventing piracy of video projected by an electronic projector as claimed in claim 1, further including a scene tag detection device which detects the type of scene to be displayed and causes the frequency controller to vary the frame rate of the projector in dependence on the type of scene.

5. A device for preventing piracy of video projected by an electronic projector as claimed in claim 4, wherein the video is pretagged to indicate both the type of scene to be displayed and the scene's variable frame rate, and the scene tag detection device detects the tags and the variable frame rate.

6. A device for preventing piracy of video projected by a projector as claimed in claim 1, wherein the video includes fast scenes and slow scenes and the frequency controller reduces the frame rate of the projector for slow scenes and increases the frame rate for fast scenes.

7. An electronic projector as claimed in claim 6, wherein at least one center high frame rate is chosen for the fast scenes and at least one center low frame rate is chosen for the slow scenes and wherein the frame rate is varied around the at least one center high frame rate for fast scenes and around the at least one center low frame rate for slow scenes.

8. An electronic projector for projecting video material onto a screen, comprising:
   an electronic frequency controller for varying frequently the frame rate of the projector based on an image characteristic of the video material such that the video material on the screen is viewable by a viewer yet the varying frame rate causes distortion for a video camera imaging the video material from the screen.

9. An electronic projector as claimed in claim 8, further including a device which stores a cryptographically secure algorithm, coupled to the frequency controller, and wherein the frequency controller varies the frame rate of the projector in accordance with the algorithm.

10. An electronic projector as claimed in claim 8, further including a natural source generator, coupled to the frequency controller, and wherein the frequency controller varies the frame rate of the projector in accordance with the natural source generator.

11. An electronic projector as claimed in claim 8, further including a scene tag detection device which detects the type of scene to be displayed and causes the frequency controller to vary the frame rate of the projector in dependence on the type of scene.

12. A device for preventing piracy of films projected by an electronic projector as claimed in claim 11, wherein the video is pretagged to indicate the type of scene to be displayed and the scene's variable frame rate, and the scene tag detection device detects the tags and the variable frame rate.

13. An electronic projector as claimed in claim 12, wherein the film is tagged for fast scenes and slow scenes and the frequency controller reduces the frame rate of the projector for slow scenes and increases the frame rate for fast scenes.

14. An electronic projector as claimed in claim 13, wherein at least one center high frame rate is chosen for fast scenes and at least one center low frame rate is chosen for slow scenes and the frame rate is varied around the at least one center high frame rate for fast scenes and around the at least one center low frame rate for slow scenes.

15. A method of preventing piracy of video material projected by an electronic projector onto a screen, comprising the steps of:
   receiving video material in the electronic projector;
   varying the frame rate of the projector based on an image characteristic of the video material to cause distortion to a video camera imaging the video material off of the screen yet the varying frame rate is substantially undetectable by a viewer watching the video material on the screen.

16. A method for preventing piracy of video material projected by an electronic projector as claimed in claim 15, wherein the step of varying the frame rate varies the frame rate of the electronic projector in accordance with a cryptographically secure algorithm.

17. A method for preventing piracy of video material projected by an electronic projector as claimed in claim 13, wherein the step of varying the frame rate varies the frame rate of the electronic projector in accordance with a natural source generator.

18. A method for preventing piracy of films projected by an electronic projector as claimed in claim 15, further including the step of:
   detecting the type of scene to be displayed;
   and wherein the step of varying the frame rate varies the frame rate of the electronic projector in dependence on the type of scene to be displayed.

19. A method for preventing piracy of video material projected by a projector as claimed in claim 15, further including the step of detecting which scenes are fast scenes and which scenes are slow scenes and wherein the step of varying the frame rate reduces the frame rate for slow scenes and increases the frame rate for fast scenes.

20. A method of preventing piracy of video material projected by an electronic projector as claimed in claim 19, wherein the video material is pretagged to indicate the type of scene to be displayed, and the step of scene detection detects the tags.

21. A method of preventing piracy of video projected by an electronic projector, comprising the steps of:
   receiving a video stream;

analyzing the video stream to detect scenes with high speed motion and scenes with little motion; and inserting in the video stream tags, which indicate high speed scenes and scenes with little motion, for use by an electronic projector to vary the frame rate of the projector in dependence on the tags.

22. A method as claimed in claim 21 wherein the step of inserting tags inserts tags which also indicate the variable frame rate the projector should use for the scenes.

23. A device for preventing piracy of video projected by an electronic projector, comprising:

an input device which receives a video stream;

an analyzer which analyzes the video stream to detect scenes with high speed motion and scenes with little motion; and a scene tagger which tags the video stream with tags which indicate high speed scenes and scenes with little motion, the tags for use by an electronic projector to vary the frame rate of the projector in dependence on the tags.

24. The device as claimed in claim 23 wherein the tagger inserts tags which also indicate the variable frame rate the projector should use when projecting the scenes.

25. A device for preventing piracy of video projected by an electronic projector on a screen, comprising:

a frequency controller which provides an output signal for varying frequently the line rate of the projector based on an image characteristic of the video, such that the varied line rate causes distortion for a video camera imaging the screen yet is undetectable by a viewer watching the screen; and an electronic projector interface which provides the output from the frequency controller to the electronic projector.

26. A device for preventing piracy of video projected by an electronic projector as claimed in claim 25, further including a device which stores a cryptographically secure algorithm, coupled to the frequency controller, and wherein the frequency controller varies the line rate of the projector in accordance with the algorithm.

27. A device for preventing piracy of video projected by an electronic projector as claimed in claim 25, further including a natural source generator, coupled to the frequency controller, and wherein the frequency controller varies the line rate of the projector in accordance with the natural source generator.

28. A device for preventing piracy of video projected by an electronic projector as claimed in claim 25, further including a scene tag detection device which detects the type of scene to be displayed and causes the frequency controller to vary the line rate of the projector in dependence on the type of scene.

29. An electronic projector for projecting video material onto a screen, comprising:

an electronic frequency controller for varying frequently the line rate of the projector based on an image characteristic of the video material such that video material on the screen is viewable by a viewer yet the varying line rate causes distortion for a video camera imaging the video material from the screen.

30. A method of preventing piracy of video material projected by an electronic projector onto a screen comprising the steps of:

receiving video material in the electronic projector; and varying the line rate of the projector based on an image characteristic of the video material to cause distortion to a video camera imaging the video material off of the screen yet undetectable by a viewer watching the video material on the screen.

31. A method for preventing piracy of video material projected by an electronic projector as claimed in claim 30, further including the step of:

providing a cryptographically secure algorithm such that the step of varying the line rate of the projector varies the frequency of the line rate of the electronic projector in accordance with the cryptographically secure algorithm.

32. A method for preventing piracy of video material projected by an electronic projector as claimed in claim 30, further including the step of:

providing a natural source generator such that the step of varying the line rate of the projector varies the frequency of the line rate of the electronic projector in accordance with the natural source generator.

33. A method of preventing piracy of video projected by an electronic projector, comprising the steps of:

receiving a video stream;

analyzing the video stream to detect scenes with high speed motion and scenes with little motion; and inserting in the video stream tags, which indicate high speed scenes and scenes with little motion, which tags are for use by an electronic projector to vary the line rate of the projector in dependence on the tags.

34. A device for preventing piracy of video projected by an electronic projector, comprising:

an input device which receives a video stream;

an analyzer which analyzes the video stream to detect scenes with high speed motion and scenes with little motion; and a tagger which tags the video stream with tags which indicate high speed scenes and scenes with little motion, the tags for use by an electronic projector to vary the line rate of the projector in dependence on the tags.

35. A device for preventing piracy of video projected by an electronic projector on a screen, comprising:

a frequency controller which provides an output signal for varying frequently the pixel rate of the projector based on an image characteristic of the video, such that the varied pixel rate causes distortion for a video camera imaging the screen yet is undetectable by a viewer watching the screen; and an electronic projector interface which provides the output from the frequency controller to the electronic projector.

36. A device for preventing piracy of video projected by an electronic projector as claimed in claim 35, further including a device which stores a cryptographically secure algorithm, coupled to the frequency controller, and wherein the frequency controller varies the pixel rate of the projector in accordance with the algorithm.

37. A device for preventing piracy of video projected by an electronic projector as claimed in claim 35, further including a natural source generator, coupled to the frequency controller, and wherein the frequency controller varies the pixel rate of the projector in accordance with the natural source generator.

38. A device for preventing piracy of video projected by an electronic projector as claimed in claim 35, further including a scene tag detection device which detects the type of scene to be displayed and causes the frequency controller to vary the pixel rate of the projector in dependence on the type of scene.

39. An electronic projector for projecting video material onto a screen, comprising:

an electronic frequency controller for varying frequently the pixel rate of the projector based on an image characteristic of the video material such that video material on the screen is viewable by a viewer yet the varying pixel rate causes distortion for a video camera imaging the video material from the screen.

40. A method of preventing piracy of video material projected by an electronic projector onto a screen comprising the steps of:

receiving video material in the electronic projector;

varying the pixel rate of the projector based on an image characteristic of the video material to cause distortion to a video camera imaging the video material off of the screen yet undetectable by a viewer watching the video material on the screen.

41. A method for preventing piracy of video material projected by an electronic projector as claimed in claim 40, further including the step of:

providing a cryptographically secure algorithm such that the step of varying the pixel rate of the projector varies the frequency of the pixel rate of the electronic projector in accordance with the cryptographically secure algorithm.

42. A method for preventing piracy of video material projected by an electronic projector as claimed in claim 40, further including the step of:

providing a natural source generator such that the step of varying the pixel rate of the projector varies the frequency of the pixel rate of the electronic projector in accordance with the natural source generator.

43. A method of preventing piracy of video projected by an electronic projector, comprising the steps of:

receiving a video stream;

analyzing the video stream to detect scenes with high speed motion and scenes with little motion; and inserting in the video stream tags, which indicate high speed scenes and scenes with little motion, which tags are for use by an electronic projector to vary the pixel rate of the projector in dependence on the tags.

44. A device for preventing piracy of video projected by an electronic projector, comprising:

an input device which receives a video stream;

an analyzer which analyzes the video stream to detect scenes with high speed motion and scenes with little motion; and a tagger which tags the video stream with tags which indicate high speed scenes and scenes with little motion, the tags for use by an electronic projector to vary the pixel rate of the projector in dependence on the tags.

45. A device for preventing piracy of video projected by an electronic projector, comprising:

input means for receiving a video stream;

analyzing means for analyzing the video stream to detect scenes with high speed motion and scenes with little motion; and tagging means for tagging the video stream with tags which indicate high speed scenes and scenes with little motion, the tags for use by an electronic projector to vary the pixel rate of the projector in dependence on the tags.

* * * * *